US012770202B2

(12) United States Patent
D'Amico et al.

(10) Patent No.: US 12,770,202 B2
(45) Date of Patent: Oct. 20, 2026

(54) SYSTEMS AND METHODS FOR STREAMLINED RESTAURANT TURNOVER

(71) Applicants: Ryan D'Amico, Shoreham, NY (US); Amanda Boland, Shoreham, NY (US)

(72) Inventors: Ryan D'Amico, Shoreham, NY (US); Amanda Boland, Shoreham, NY (US)

( * ) Notice: Subject to any disclaimer, the term of this patent is extended or adjusted under 35 U.S.C. 154(b) by 0 days.

(21) Appl. No.: 19/261,247

(22) Filed: Jul. 7, 2025

(65) Prior Publication Data

US 2026/0010962 A1 Jan. 8, 2026

Related U.S. Application Data

(60) Provisional application No. 63/668,491, filed on Jul. 8, 2024.

(51) Int. Cl.
*G06Q 50/12* (2012.01)
*G06F 3/0482* (2013.01)
(Continued)

(52) U.S. Cl.
CPC ........... *G06Q 50/12* (2013.01); *G06F 3/0482* (2013.01); *G06F 3/0488* (2013.01);
(Continued)

(58) Field of Classification Search
CPC ............... G06Q 50/12; G06Q 10/0281; G06Q 30/0284; G06Q 30/0631; G06Q 30/06331;
(Continued)

(56) References Cited

U.S. PATENT DOCUMENTS 6,741,969 B1 * 5/2004 Chen .................. G06Q 30/0235 705/14.27
8,041,605 B1 * 10/2011 Harrity .................. G06Q 10/00 705/16
(Continued)

FOREIGN PATENT DOCUMENTS

AU 2021268690 A1 * 10/2022 ............. G06Q 50/12
JP 3949907 B2 * 7/2007 ............. G06Q 50/12
(Continued)

OTHER PUBLICATIONS

Andy Pandharikar; Frederik Bussler, AI-Powered Commerce: Building the products and services of the future with Commerce.AI , Packt Publishing, 2022. (Year: 2022).*
(Continued)

*Primary Examiner* — Ashford S Hayles
(74) *Attorney, Agent, or Firm* — Shore IP Group, PLLC; Sean R. Wilsusen

(57) ABSTRACT

A system for streamlined restaurant turnover includes a processor and a memory that includes instructions stored thereon, which, when executed by the processor, cause the system to access a plurality of restaurants based on the user preferences and at least one of a geographic proximity of the user or a prior selection of the user; display at least some of the restaurants on a first graphical user interface; receive a selection of a restaurant of the plurality of restaurants by a first touch command of the user on the first graphical user interface; display a subset of a plurality of menu items based on a category; receive, as an order, a selection of at least one menu item; and transmit, to a second graphical user interface configured for use on an electronic device of a restaurant manager or staff which tracks tables and provides an interaction with users, the order.

10 Claims, 10 Drawing Sheets

(51) Int. Cl.

| | |
|---|---|
| ***G06F 3/0488*** | (2022.01) |
| ***G06Q 10/02*** | (2012.01) |
| ***G06Q 30/0283*** | (2023.01) |
| ***G06Q 30/0601*** | (2023.01) |
| ***G10L 15/18*** | (2013.01) |
| ***H04W 4/02*** | (2018.01) |

(52) U.S. Cl.
CPC ..... *G06Q 10/0281* (2025.08); *G06Q 30/0284* (2013.01); *G06Q 30/0631* (2013.01); *G06Q 30/06331* (2025.08); *G06Q 30/0643* (2013.01); *G10L 15/1822* (2013.01); *H04W 4/025* (2013.01)

(58) Field of Classification Search
CPC . G06Q 30/0643; G06F 3/0482; G06F 3/0488; G10L 15/1822; H04W 4/025
See application file for complete search history.

(56) References Cited

U.S. PATENT DOCUMENTS

| | | | | |
|---|---|---|---|---|
| 10,346,767 | B2 * | 7/2019 | Hammann | G06Q 30/02 |
| 10,395,186 | B1 * | 8/2019 | McCullough | G06Q 10/025 |
| 2002/0026364 | A1 * | 2/2002 | Mayer | G06Q 30/02 705/15 |
| 2002/0178024 | A1 * | 11/2002 | Terakoshi | G06Q 40/04 705/418 |
| 2004/0138929 | A1 * | 7/2004 | Awiszus | G06Q 10/02 705/5 |
| 2007/0250355 | A1 * | 10/2007 | Leet | G06Q 10/04 705/5 |
| 2009/0292566 | A1 * | 11/2009 | Bossert | G06Q 10/02 705/5 |
| 2010/0070374 | A1 * | 3/2010 | Carter | G06Q 20/203 705/28 |
| 2010/0161432 | A1 * | 6/2010 | Kumanov | G06Q 30/0281 705/40 |
| 2013/0304527 | A1 * | 11/2013 | Santos, III | G06Q 10/40 705/14.66 |
| 2014/0046715 | A1 * | 2/2014 | Lau | G06Q 10/1093 705/7.19 |
| 2014/0244324 | A1 * | 8/2014 | Ford | G06Q 50/12 705/5 |
| 2014/0257877 | A1 * | 9/2014 | L'Heureux | G06Q 30/06 705/5 |
| 2014/0310030 | A1 * | 10/2014 | Cheranda | G06Q 10/02 705/5 |
| 2014/0379432 | A1 * | 12/2014 | Goldman | G06Q 30/0206 705/7.35 |
| 2015/0088671 | A1 * | 3/2015 | Xiong | G06Q 50/12 705/15 |
| 2015/0178712 | A1 * | 6/2015 | Angrish | G06Q 20/20 705/5 |
| 2016/0117612 | A1 * | 4/2016 | Hong | G06F 3/0482 705/5 |
| 2017/0278022 | A1 * | 9/2017 | Mimassi | G06Q 10/02 |
| 2017/0278204 | A1 * | 9/2017 | Mimassi | G06Q 50/12 |
| 2017/0364836 | A1 * | 12/2017 | Li | G06Q 10/02 |
| 2018/0068237 | A1 * | 3/2018 | Matsui | G06Q 10/02 |
| 2018/0096440 | A1 * | 4/2018 | Lopez | G06Q 30/0259 |
| 2018/0276770 | A1 * | 9/2018 | Cronin | G06Q 50/12 |
| 2018/0293489 | A1 * | 10/2018 | Eyster | G06N 3/044 |
| 2018/0365663 | A1 * | 12/2018 | Bell | G06Q 20/102 |
| 2019/0095882 | A1 * | 3/2019 | Parker | H04L 67/60 |
| 2019/0102788 | A1 * | 4/2019 | Lewis | G06Q 30/0223 |
| 2019/0213506 | A1 * | 7/2019 | Greenberger | G06Q 10/02 |
| 2019/0266679 | A1 * | 8/2019 | Ikenoue | G06Q 50/12 |
| 2020/0167701 | A1 * | 5/2020 | Debono | G06Q 10/02 |
| 2020/0249660 | A1 * | 8/2020 | Rao | A21B 1/42 |
| 2020/0334586 | A1 * | 10/2020 | Petroulas | G06Q 10/02 |
| 2020/0342550 | A1 * | 10/2020 | Halimsaputera | G16H 20/60 |
| 2021/0224697 | A1 * | 7/2021 | Stolts, II | G06Q 10/02 |
| 2021/0374885 | A1 * | 12/2021 | Musk | G06Q 20/40155 |
| 2021/0406815 | A1 * | 12/2021 | Mimassi | G06Q 10/028 |
| 2022/0138710 | A1 * | 5/2022 | Colvin | G06Q 20/12 705/40 |
| 2022/0222588 | A1 * | 7/2022 | Petroulas | G06Q 10/02 |
| 2022/0230122 | A1 * | 7/2022 | Mimassi | G06F 16/9035 |
| 2022/0351268 | A1 * | 11/2022 | Alam | G06N 20/00 |
| 2023/0100529 | A1 * | 3/2023 | Petroulas | G06Q 10/02 705/4 |
| 2024/0013191 | A1 * | 1/2024 | Alexander | G06Q 20/326 |
| 2024/0087059 | A1 * | 3/2024 | Hall | G06Q 10/043 |
| 2024/0211971 | A1 * | 6/2024 | Cunningham | G06Q 30/0201 |
| 2024/0289864 | A1 * | 8/2024 | Seabrook | H04W 4/021 |
| 2024/0290171 | A1 * | 8/2024 | Gause | G07F 17/3255 |
| 2024/0346568 | A1 * | 10/2024 | Burt | G06Q 30/0207 |

FOREIGN PATENT DOCUMENTS

| | | | | |
|---|---|---|---|---|
| JP | 2022062647 | A * | 4/2022 | |
| KR | 20200111349 | A * | 9/2020 | G06Q 50/12 |
| KR | 20230023431 | A * | 2/2023 | G06Q 50/10 |
| WO | WO-2021222975 | A1 * | 11/2021 | G06Q 20/14 |

OTHER PUBLICATIONS

Bertram, Colin. "Yelp Takes Larger Bite out of Restaurant Reservation Market." Bloomberg.Com, Feb. 2019, p. N.PAG. EBSCOhost, research.ebsco.com/plink/de0e5b92-7e0f-3fef-874b-034137b941d9. (Year: 2019).*

"Kakaku.Com: Launch of Japan's Largest Restaurant Reservation Service for Overseas Visitors." Business Wire (English), Jun. 2024. EBSCOhost, research.ebsco.com/plink/ec3f9041-e708-3844-aaf1-91640f7851e7. (Year: 2024).*

Alexandrov, Alexei, and Martin A. Lariviere. "Are Reservations Recommended?" Manufacturing & Service Operations Management (M&SOM) (INFORMS), vol. 14, No. 2, Apr. 2012, pp. 218-230. EBSCOhost, https://doi.org/10.1287/msom.1110.0360. (Year: 2012).*

* cited by examiner

800

900

SYSTEMS AND METHODS FOR STREAMLINED RESTAURANT TURNOVER

CROSS-REFERENCE TO RELATED APPLICATION

The present non-provisional patent application claim priority to U.S. Provisional Patent Application No. 63/668,491, filed on Jul. 8, 2024, the entire contents of which are incorporated by reference herein.

FIELD

The present disclosure relates to a restaurant turnover system and, more particularly, to a device, system, and method for streamlined restaurant turnover using predictive analysis.

BACKGROUND

Customer dining experiences are important for the success of restaurants. Customers need to communicate personal and historical preferences and dietary requirements. Restaurant management want to know when their customers will arrive and also want to maintain minimal staff while maintaining a high quality of service. Existing restaurant systems have been insufficient to provide all the functionality required to offer the customer a complete dining experience.

Therefore, there is a need for streamlined restaurant turnover and an improved customer experience.

SUMMARY

The present disclosure relates to a restaurant turnover system and, more particularly, to a device, system, and method for streamlined restaurant turnover using predictive analysis.

Provided in accordance with aspects of the present disclosure is a system for streamlined restaurant turnover. The system includes a processor and a memory. The memory includes instructions stored thereon, which, when executed by the processor, cause the system to verify credentials of a user and access user preferences; access a geographic location of the user; access a plurality of restaurants based on the user preferences and at least one of a geographic proximity of the user or a prior selection of the user; display at least some of the restaurants of the plurality of restaurants on a first graphical user interface; receive a selection of a restaurant of the plurality of restaurants by a first touch command of the user on the first graphical user interface; access, from a database, a menu from the selected restaurant of the plurality of restaurants; display a subset of a plurality of menu items based on a category; receive, as an order, a selection of at least one menu item of the subset of the plurality of menu items, by a second touch command of the user on the first graphical user interface; and transmit, to a second graphical user interface configured for use on an electronic device of a restaurant manager or staff which tracks tables and provides an interaction with users, the order.

In an aspect of the present disclosure, the instructions, when executed by the processor, may further cause the system to: store data gathered during the user dining experiences within a database for use in providing recommendations.

In an aspect of the present disclosure, wherein the instructions, when executed by the processor, may further cause the system to: parse, by a natural language model, the user dining experiences; and predict, by a machine learning network, one or more recommendations based on the parsed user dining experiences.

In an aspect of the present disclosure, the instructions, when executed by the processor, may further cause the system to: display on the first graphical user interface a map of a plurality of tables in a restaurant with an indication of available times and durations for each of the plurality of tables; and receive a selection of a particular table of the plurality of tables by a touch command of the user on the first graphical user interface.

In an aspect of the present disclosure, the instructions, when executed by the processor, may further cause the system to: transmit, to the second graphical user interface, the selection of the particular table; and provide an indication confirming the reservation of the selected particular table for a specific time.

In an aspect of the present disclosure, the instructions, when executed by the processor, may further cause the system to: provide a recommendation on the first graphical user interface of certain foods based on a dining speed preference.

In an aspect of the present disclosure, the restaurant may be at a sporting event.

In an aspect of the present disclosure, the instructions, when executed by the processor, may further cause the system to: provide a geolocation of the user; and cause the delivery of concessions to the geolocation.

In an aspect of the present disclosure, the instructions, when executed by the processor, may further cause the system to: display a prompt for selecting a desired food service speed; and display a prompt for selecting a desired duration of occupying the table.

In an aspect of the present disclosure, the instructions, when executed by the processor, may further cause the system to: set a price for the order based on the desired duration the user will occupy the table.

Provided in accordance with aspects of the present disclosure is a computer-implemented method for streamlined restaurant turnover. The method includes verifying credentials of a user and accessing user preferences; accessing a geographic location of the user; accessing a plurality of restaurants based on the user preferences and at least one of a geographic proximity of the user or a prior selection of the user; displaying at least some of the restaurants of the plurality of restaurants on a first graphical user interface; receiving a selection of a restaurant of the plurality of restaurants by a first touch command of the user on the first graphical user interface; accessing, from a database, a menu from the selected restaurant of the plurality of restaurants; displaying a subset of a plurality of menu items based on a category; receiving, as an order, a selection of at least one menu item of the subset of the plurality of menu items, by a second touch command of the user on the first graphical user interface; and transmitting, to a second graphical user interface configured for use on an electronic device of a restaurant manager or staff which tracks tables and provides an interaction with users, the order.

In an aspect of the present disclosure, the method may further include storing data gathered during the user dining experiences within a database for use in providing recommendations.

In an aspect of the present disclosure, the method may further include parsing, by a natural language model, the user dining experiences; and predicting by a machine learning network, one or more recommendations based on the parsed user dining experiences.

In an aspect of the present disclosure, the method may further include displaying on the first graphical user interface a map of a plurality of tables in a restaurant with an indication of available times and durations for each of the plurality of tables; and receiving a selection of a particular table of the plurality of tables by a touch command of the user on the first graphical user interface.

In an aspect of the present disclosure, the method may further include transmitting, to the second graphical user interface, the selection of the particular table; and displaying an indication confirming the reservation of the selected particular table for a specific time.

In an aspect of the present disclosure, the method may further include providing a recommendation on the first graphical user interface of certain foods based on a dining speed preference.

In an aspect of the present disclosure, the restaurant may be at a sporting event.

In an aspect of the present disclosure, the method may further include providing a geolocation of the user; and causing the delivery of concessions to the geolocation.

In an aspect of the present disclosure, the method may further include displaying a prompt for selecting a desired food service speed; and displaying a prompt for selecting a desired duration of occupying the table.

In an aspect of the present disclosure, the method may further include setting a price for the order based on the desired duration the user will occupy the table.

BRIEF DESCRIPTION OF THE DRAWINGS

Various aspects and features of the present disclosure are described hereinbelow with reference to the drawings wherein.

DETAILED DESCRIPTION

Figure 1:
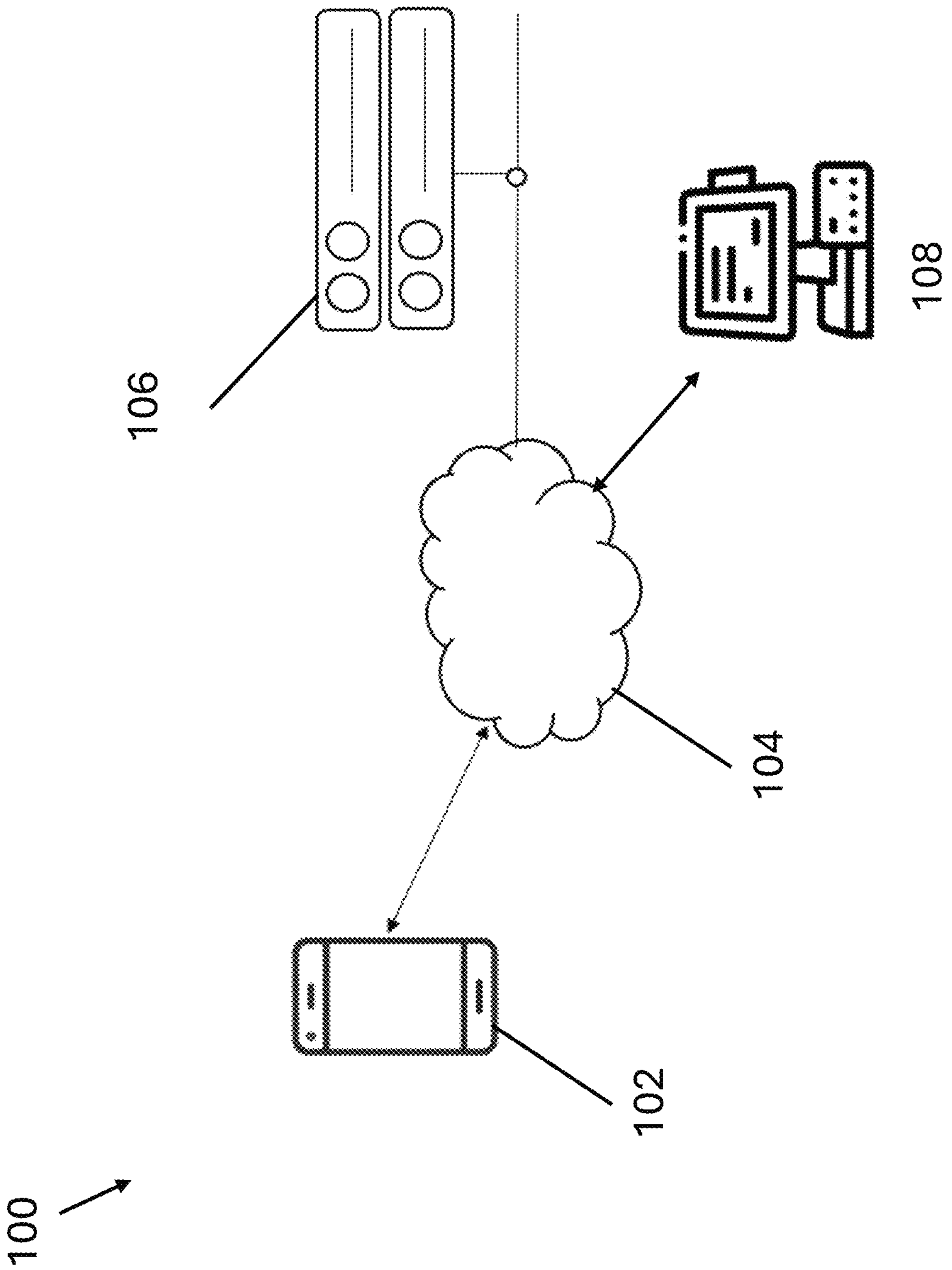
FIG. 1 is a block diagram of an architecture for streamlined restaurant turnover system, according to aspects of the present disclosure.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

The present disclosure relates to a restaurant turnover system and, more particularly, to a device, system, and method for streamlined restaurant turnover using predictive analysis.

Referring particularly to FIG. 1, a system 100 for streamlined restaurant turnover generally includes a mobile device 102, a home computer, a server 106, a laptop, and/or a tablet in network 104 communication with a restaurant POS system 108. The mobile device 102, a home computer, a server 106, a laptop, and/or a tablet may be or may include a general-purpose computer 200 (e.g., including a processor), of FIG. 2, configured for network 104 communications.

Figure 2:
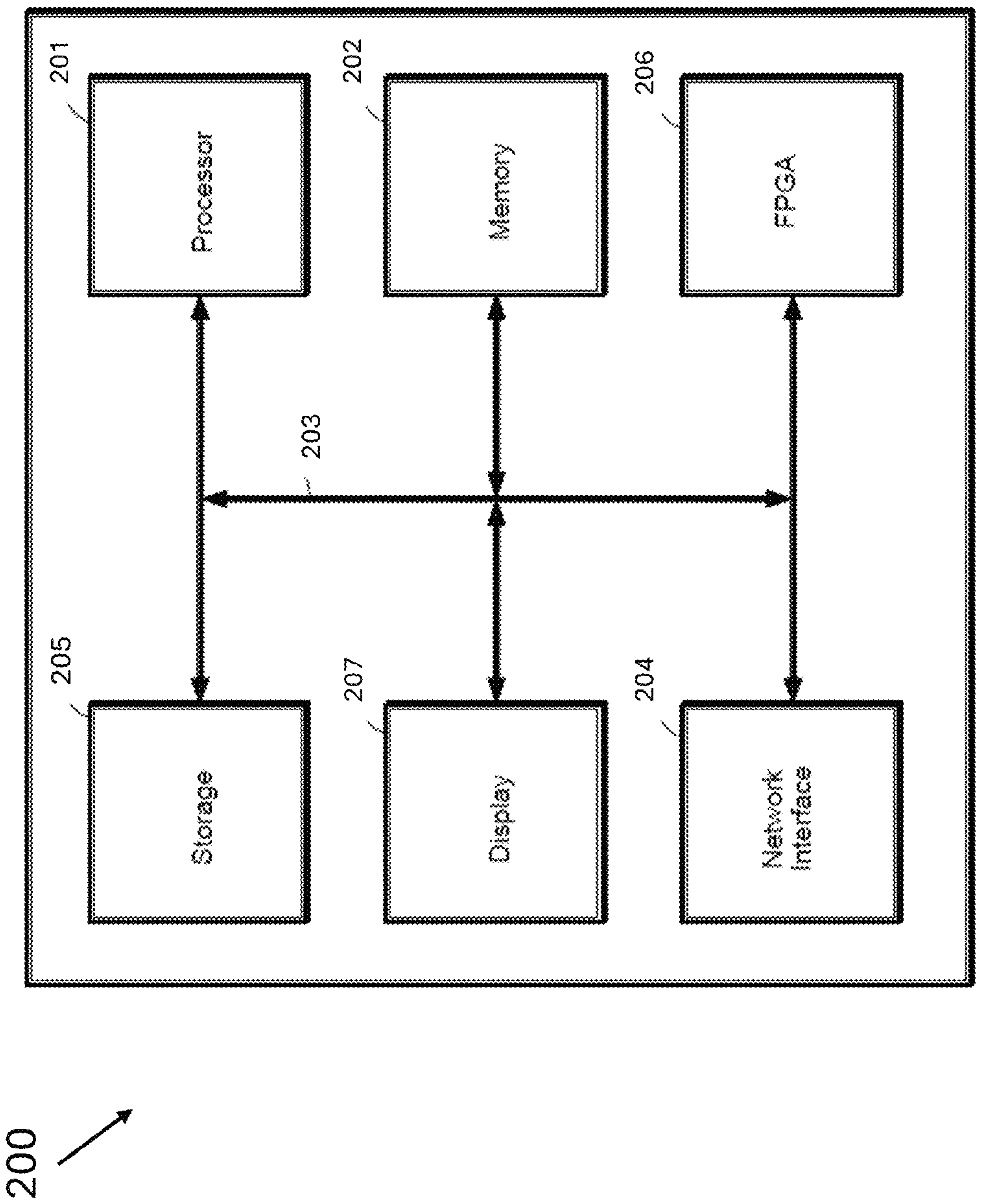
FIG. 2 is a block diagram of an exemplary computer employable by the device, system, and method described herein according to aspects of the present disclosure.

Referring to FIG. 2, the general-purpose computer 200 employable by the system 100 is described. The computer 200 may include a processor 201 connected to a computer-readable storage medium or a memory 202 which may be a volatile type memory, e.g., RAM, or a non-volatile type memory, e.g., flash media, disk media, etc. The processor 201 may be another type of processor such as, without limitation, a digital signal processor, a microprocessor, an ASIC, a graphics processing unit (GPU), field-programmable gate array (FPGA), or a central processing unit (CPU).

In some aspects of the disclosure, the memory 202 can be random access memory, read-only memory, magnetic disk memory, solid state memory, optical disc memory, and/or another type of memory. The memory 202 can communicate with the processor 201 through communication buses 203 of a circuit board and/or through communication cables such as serial ATA cables or other types of cables. The memory 202 includes computer-readable instructions that are executable by the processor 201 to operate the computer 200 to execute the various functions described herein. The computer 200 may include a network interface 402) to communicate (e.g., through a wired or wireless connection) with other computers or a server. A storage device 205 may be used for storing data. The computer 200 may include one or more FPGAs 206. The FPGAs 206 may be used for executing various functions described herein. A display 207 may be employed to display data processed by the computer 200.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a “circuit,” “module,” “unit” or “system.” Furthermore, aspects of the present disclosure may take the form of a computer program product embodied in one or more computer readable medium(s) having computer readable program code embodied thereon. If implemented in software, the functions may be stored on or transmitted over as one or more instructions or code on a tangible, non-transitory computer-readable medium.

Herein, the term “circuit” may refer to an analog circuit or a digital circuit. In the case of a digital circuit, the digital circuit may be hard-wired to perform the corresponding tasks of the circuit, such as a digital processor that executes instructions to perform the corresponding tasks of the circuit. Examples of such a processor include an application-specific integrated circuit (ASIC) and a field-programmable gate array (FPGA).

Figure 3:
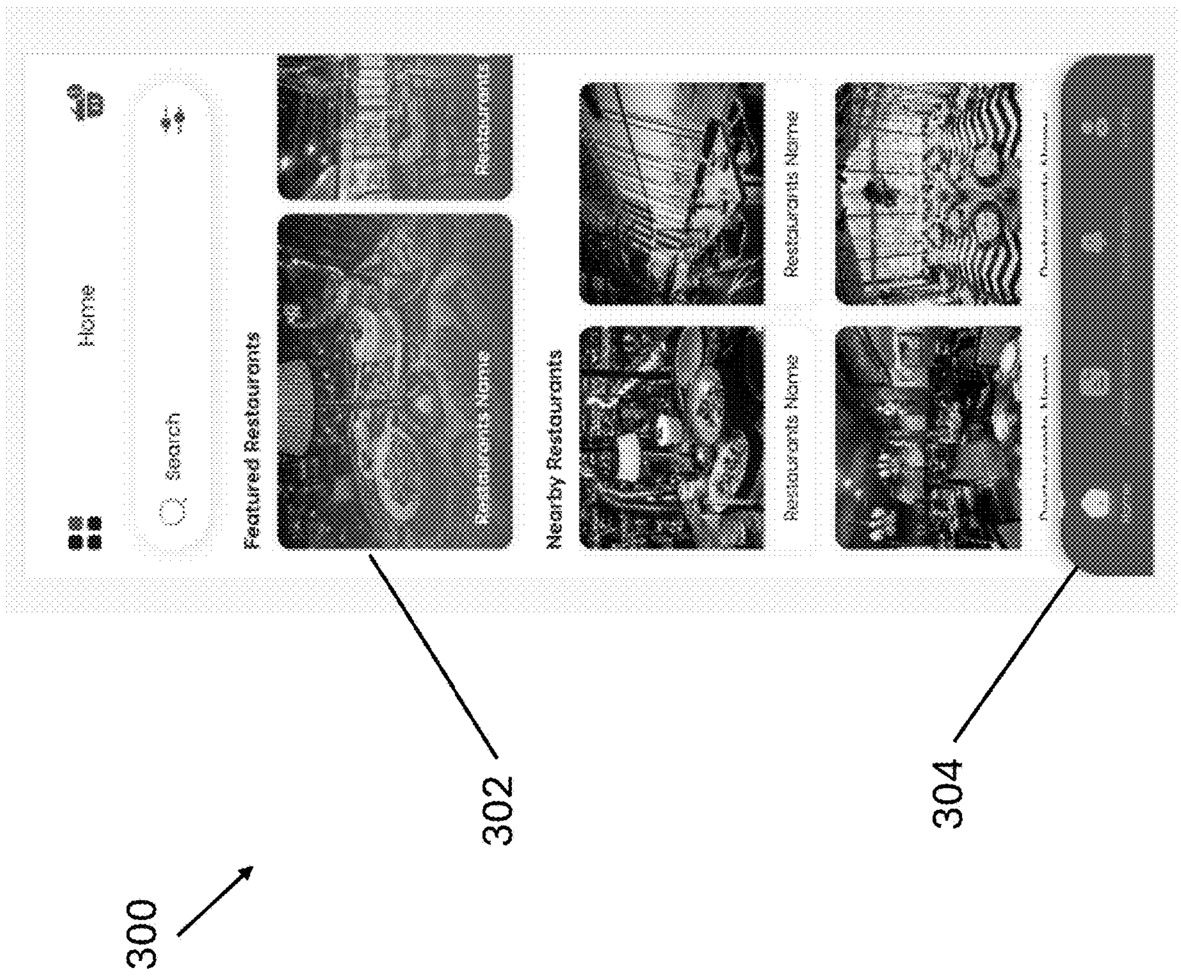
FIG. 3 is an example graphical user interface for the system for streamlined restaurant turnover according to aspects of the present disclosure.

FIG. 3 is an example graphical user interface (GUI) 300 for the system 100 for streamlined restaurant turnover according to aspects of the present disclosure. The GUI may include a menu bar 304 and a main selection area 302. The GUI 300 may be configured for receiving a selection based on one or more touch gestures of a user.

Figure 4:
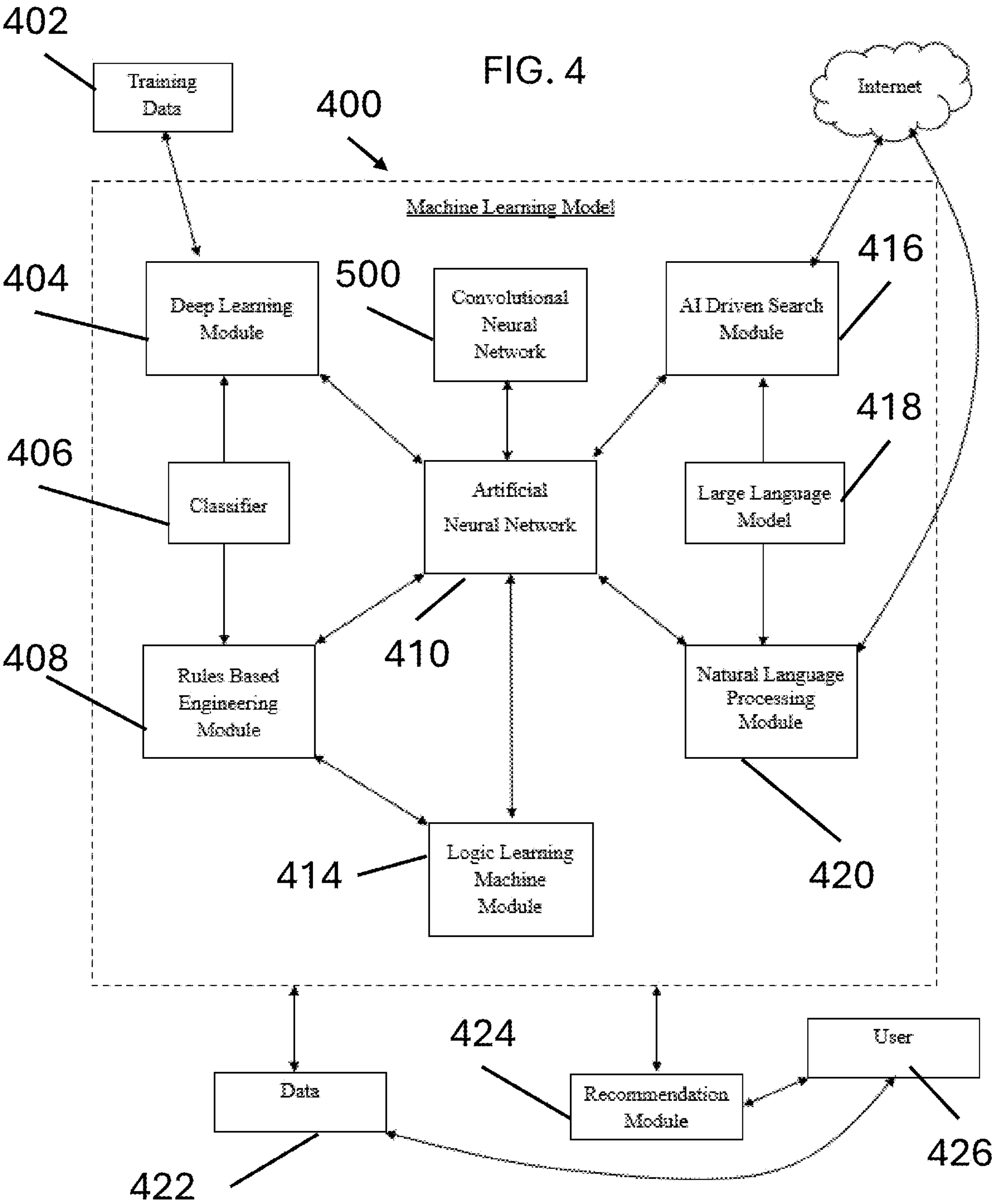
FIG. 4 is a schematic illustration of a machine learning model architecture including an artificial neural network according to aspects of the present disclosure.

FIG. 4 is a schematic illustration of a machine learning model architecture including an artificial neural network according to aspects of the present disclosure.

The machine learning model 400 may include a deep learning module 404, a classifier 406, a rules-based engineering model 408, and/or a logic learning machine module, any of which may be iteratively trained using a training data set, such as a training data set stored in a training data set database (see, e.g., training data 402).

The machine learning model 400 may include an AI driven search module 416, a large language model 418, and/or a natural language processing module 420, and of which may be selectively connected to the internet.

An exemplary description of how each of the AI modules are employed and interact is provided below. In the exemplary context below, the AI modules are being used for the streamlined restaurant turnover system 100 using predictive analysis.

The AI driven search module 416 enhances the system by dynamically sourcing and integrating external information relevant to the user's selections of restaurants and/or menu selections. The AI driven search module 416 may filter through material available on the internet to identify and retrieve up-to-date restaurant information (e.g., reviews and social media posts) to keep the user's recommendations current, comprehensive, and reflective of the user's intent. The AI driven search module 416 may work in conjunction with the natural language processing and/or the large language model 418 to refine search queries based on the context and specifics of the restaurant and/or menu selection, ensuring that the information added is both pertinent to the restaurant and/or menu selections.

The large language model 418 may serve a role in enhancing the textual components of the restaurant and/or menu selections. The large language model 418 can process and interpret natural language, the large language model 418 may generate comprehensive summaries reflecting a user's preferences, utilizing structured data from other system modules like the classifier's restaurant and/or menu selections qualities. The large language model 418 can also refine and personalize the textual content of reviews for the restaurant and/or menu selections. Furthermore, it may assist in processing and understanding user queries or feedback, facilitating a more interactive and responsive user experience within the streamlined restaurant turnover system 100.

The large language model 418 may receive structured data and insights from the deep learning module 404, CNN 500, and artificial neural network, which analyze the reviews and/or restaurant/menu selections. The large language model 418 uses this information to generate detailed recommendations that accurately reflect the user's preferences. In collaboration with the AI-driven search module, it helps to incorporate relevant, up-to-date information from all of a user's interactions with the system 100, ensuring the recommendations remain current and accurate. The classifier's outputs are utilized by the large language model 418 to tailor the language and tone of any suggestion, making it resonate with the user. Moreover, inputs from the rules-based engineering module and the logic learning machine module enable the large language model 418 to adhere to predetermined logic and patterns, ensuring the generated recommendations meet the user's dietary needs and preferences. The natural language processing module further refines the large language model's output, enhancing its ability to understand and generate human-like text, thereby ensuring the recommendation is contextually relevant to the intended audience.

The natural language processing module 420 may play a role in understanding and generating human language, enabling the system to process and interpret user inputs, feedback, and textual content within the system and enables the conversation experience to lead to efficient business fulfilment. The natural language processing module 420 may analyze the structured data provided by modules like the convolutional neural network and the deep learning module, extracting meaningful insights about the restaurant/menu selections. The natural language processing module 420 also enhances the readability and personalization of the interaction by refining the language used, ensuring that it's not only accurate but also engaging and accessible to the intended audience. Furthermore, it supports interactive features, such as responding to user queries or feedback in natural, conversational language, making the system more user-friendly and dynamic.

The natural language processing module enhances its functionality through interactions with various other modules, ensuring a robust integration of language understanding and generation capabilities. The natural language processing module 420 works closely with the large language model 418 to refine the generated response, utilizing the large language model's extensive database of language patterns to produce contextually relevant and coherent text. The natural language processing module 420 also processes and interprets data from the deep learning module 404 and the convolutional neural network 500, translating intricate patterns and visual insights into descriptive textual elements that add depth and detail to the response and potentially provide recommendations to the user. In collaboration with the AI-driven search module, the natural language processing module optimizes search queries to source the most relevant information. The classifier's categorizations guide the natural language processing module in tailoring the textual content to align with the generated response, ensuring a high degree of personalization. Furthermore, the natural language processing module applies the structured data and logical frameworks developed by the rules-based engineering module and the logic learning machine module to apply consistent linguistic standards and adapt the user's recommendation to reflect logical deductions, maintaining both clarity and relevance.

The machine learning model may also include a convolutional neural network (CNN) 500. In particular, the CNN 500 can be employed to perform the video analysis described herein based parsing reviews, interactions, and/or data, and recommendations may be made to the user via the recommendation module.

Figure 5:
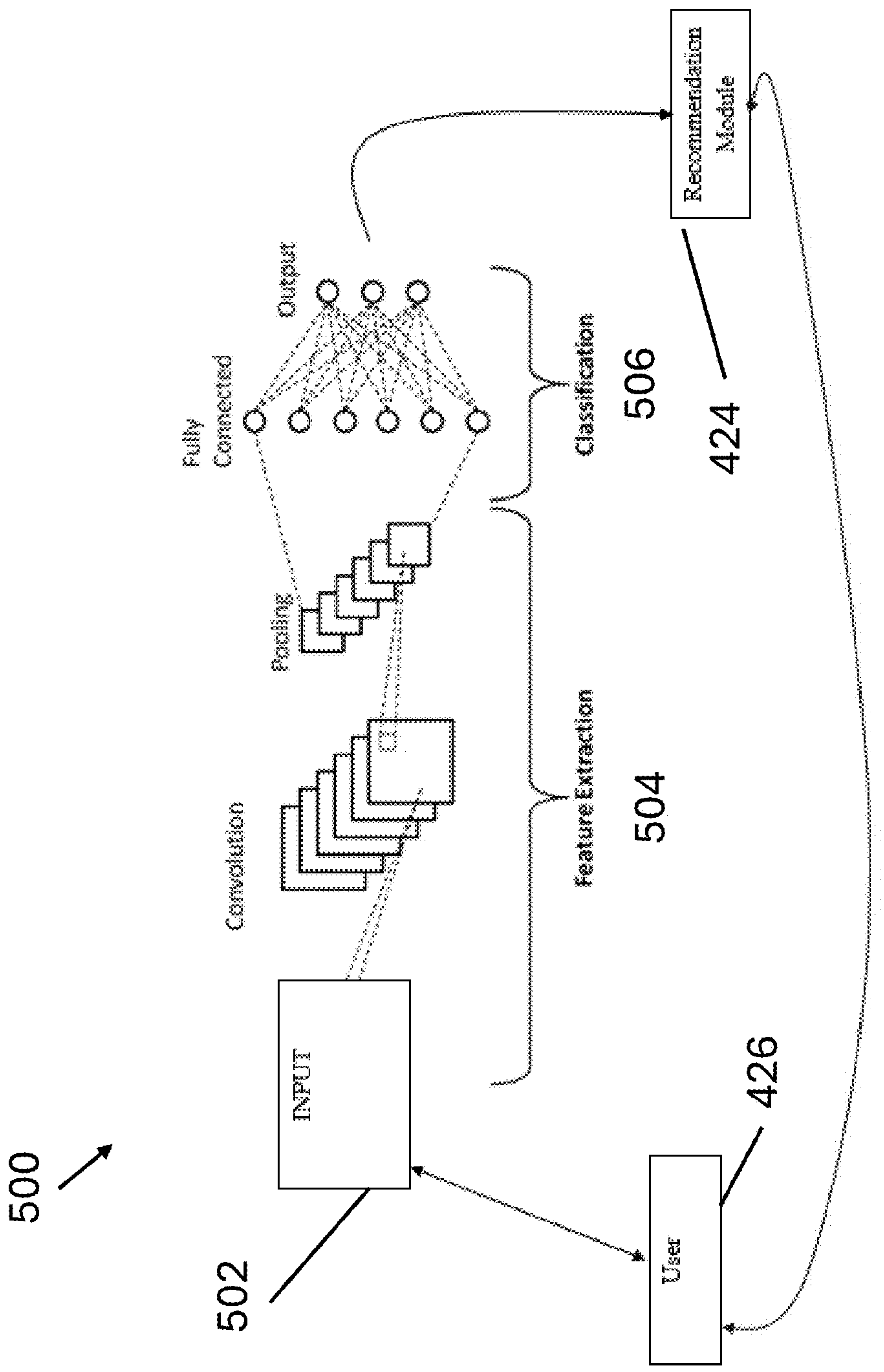
FIG. 5 is a schematic illustration of a convolutional neural network employable by the machine learning model of FIG. 4 according to aspects of the present disclosure.

FIG. 5 is a schematic illustration of a convolutional neural network (CNN) employable by the machine learning model 400 of FIG. 4 according to aspects of the present disclosure.

In CNNs feature extraction 504 is the process of automatically identifying relevant patterns or features from input data, often through convolutional layers. These layers consist of filters or kernels that slide over the input data, such as images, extracting features such as edges, textures, or shapes. Each filter performs a mathematical operation on the input data, producing feature maps that highlight different aspects of the image. Through the training process, the CNN 500 learns to adjust the parameters of these filters to extract increasingly complex and meaningful features from the data.

Pooling is a down sampling technique commonly applied after feature extraction in the CNN 500. Pooling layers reduce the dimensionality of the feature maps by summarizing the information within local regions. The most common pooling operation is max pooling, where the maximum value within each region is retained while discarding the rest. This process helps to make the learned features more invariant to small variations in the input, reducing computational complexity and preventing overfitting. By iteratively applying feature extraction and pooling layers, the model can hierarchically learn to represent the input data in a way that is conducive to solving the target task, such as image classification or object detection.

Following feature extraction and pooling, the output is typically fed into one or more fully connected layers in the CNN 500, which serve as classifiers 506. These layers take the high-level features extracted from the previous layers and map them to the target classes or categories. During training, the parameters of these layers are optimized through techniques like backpropagation and gradient descent, minimizing the difference between the predicted class probabilities and the actual labels in the training data. In the case of classification tasks, the final layer often employs a SoftMax activation function to produce a probability distribution over the possible classes, allowing the model to make predictions by selecting the class with the highest probability. By leveraging feature extraction, pooling, and classification in conjunction, the CNN 500 can effectively learn to recognize and classify patterns in complex data such as images, text, or audio.

For example, based on user restaurant and/or menu selection data, the CNN 500 will generate an output for the recommendation module 426. The recommendation module 426 can then analyze this output to determine the user's intent to identify and suggest an objective for the user, such as recommending a particular restaurant or type of meal at a restaurant.

Figure 6:
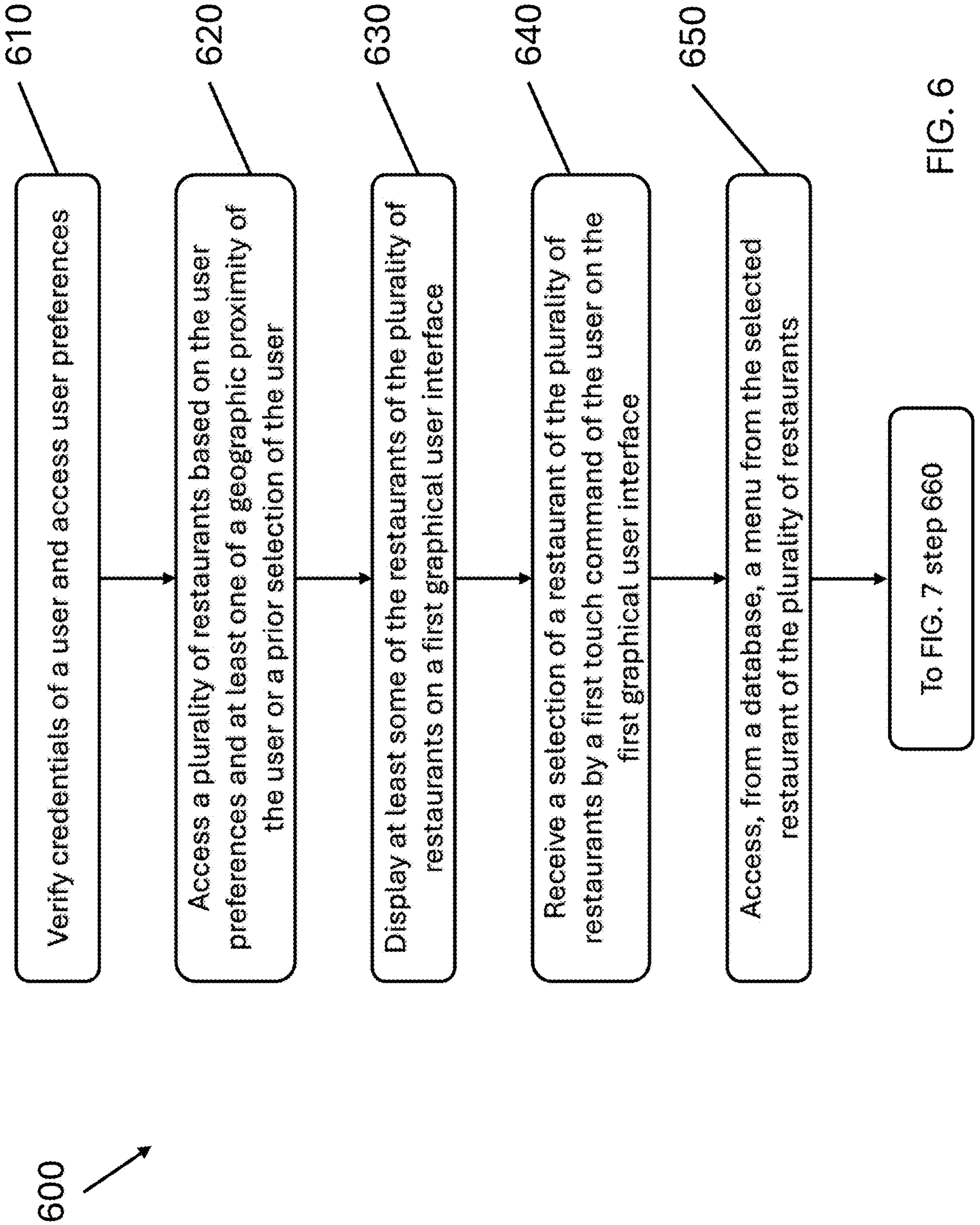
FIGS. 6 and 7 are flow charts for a method for streamlined restaurant turnover according to aspects of the present disclosure.
Figure 7:
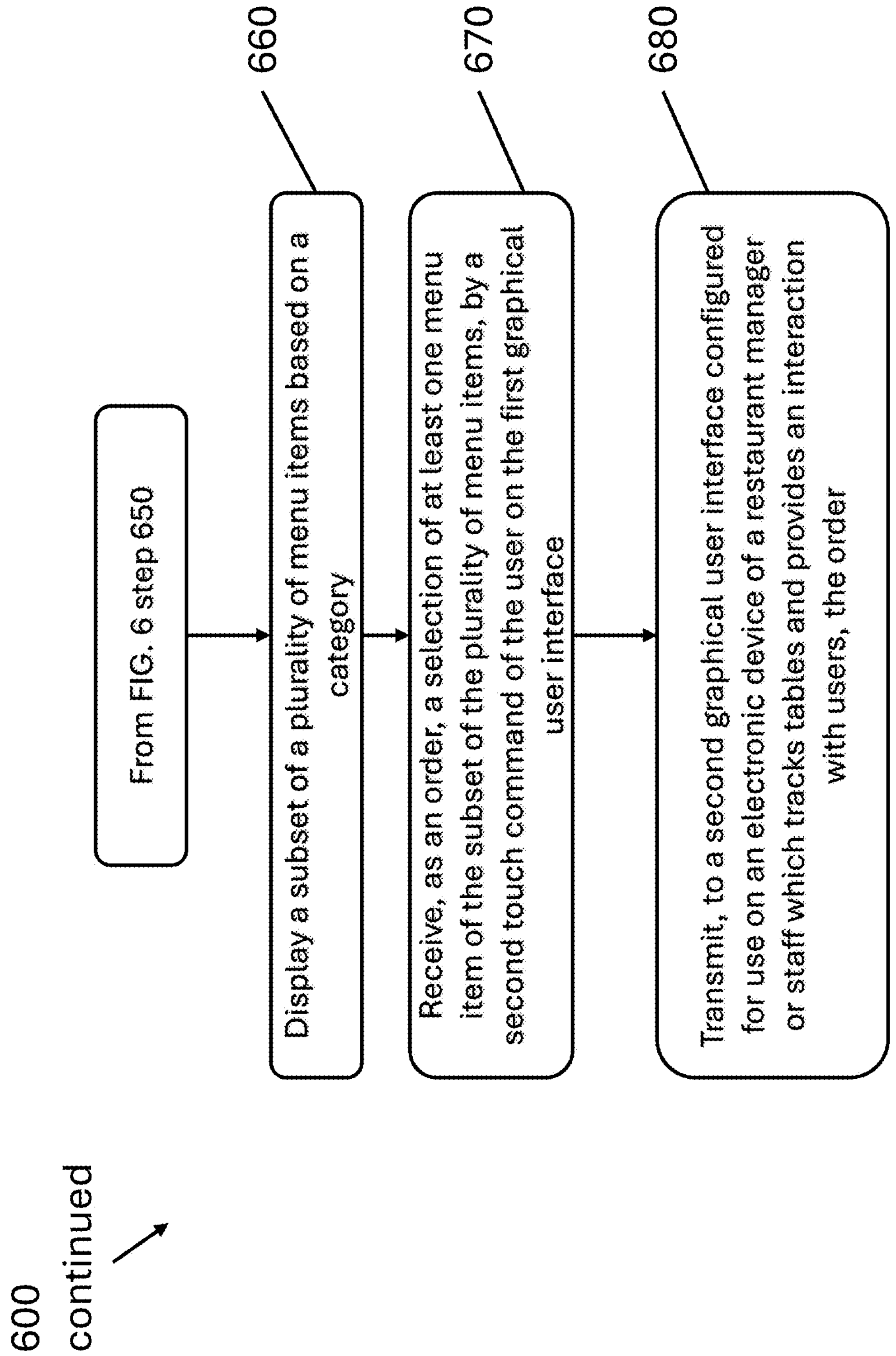

With reference to FIGS. 6 and 7, a method 600 for streamlined restaurant turnover using system 100 of FIG. 1 is shown. The method 600 may be performed by the processor 200 of FIG. 2. Portions of the method 600 may be performed by a separate device, such as a server. Interactions between a user and the system 100 may be performed using a graphical user interface 300, such as the ones depicted in FIGS. 3 and 8-10. The system 100 provides the benefit of enabling the restaurant to receive a user's order and reservation information in advance, which enables the restaurant to pre-order the food they need, thereby solving the issue of food waste by reducing the amount of food waste for the restaurant. The system 100 solves the problem of inefficient turnover (caused in-part by the legacy systems not communicating with each other) by providing the technical solution of helping a restaurant turn over more tables more efficiently (i.e., fewer errors, lower food costs, better customer service and experience).

Initially, at step 610, the processor causes the system 100 to verify credentials of a user and access user preferences. In aspects of the present disclosure, the processor may cause the system 100 to access a geographic location of the user. For example, when a user attempts to log in to the system 100, the user's credentials may be verified through a secure authentication process. Initially, the user enters their username and password into the app's login interface. This information is then securely transmitted to the app's server, typically encrypted using HTTPS to protect against eavesdropping. The server receives the credentials and checks them against the stored data in its database. If the username matches an existing account, the server hashes the entered password and compares it with the stored hashed password. If both match, the server may generate a session token, which is sent back to the system 100 and stored locally on the user's device, granting them access to their account. This session token may be used to authenticate subsequent requests without requiring the user to re-enter their credentials, ensuring a seamless and secure user experience. If the credentials do not match, the user is notified of an incorrect username or password, prompting them to try again or reset their password if necessary. The system 100 may receive verification of the user's credentials via a third party system.

At step 620, the processor causes the system 100 to access a plurality of restaurants based on the user preferences, a geographic proximity of the user, and/or a prior selection of the user. For example, the geographic location of the user may be determined by a GPS of the user's mobile device or may be manually entered (e.g., based on a prompt).

At step 630, the processor causes the system 100 to display at least some of the restaurants of the plurality of restaurants on a first graphical user interface. In aspects of the present disclosure, the system 100 may display map and/or directions to navigate to the displayed restaurants. For example, the system 100 may enhance user convenience by integrating map and navigation features to help users find their desired dining locations. Upon selecting a restaurant, the system 100 retrieves the restaurant's address from its database and utilizes a mapping service, such as Google Maps® or Apple Maps®, to display the location on an interactive map within the GUI of the system 100. This map can show the restaurant's precise location with a marker, along with nearby landmarks for context. Users can view their current location, enabling the system 100 to provide real-time directions. The system 100 typically offers multiple navigation options, such as driving, walking, or public transit routes, complete with step-by-step instructions. By leveraging the device's GPS, the system 100 can provide dynamic updates on the user's progress and estimated arrival time, ensuring an accurate and efficient route. This seamless integration of mapping and navigation features significantly enhances the user's dining experience by making it easy to locate and travel to the restaurant.

At step 640, the processor causes the system 100 to receive a selection of a restaurant of the plurality of restaurants by a first touch command of the user on the first graphical user interface.

At step 650, the processor causes the system 100 to access, from a database, a menu from the selected restaurant of the plurality of restaurants.

At step 660, the processor causes the system 100 to display a subset of a plurality of menu items based on a category. For example, the system 100 may filter the menu items based on a user's food allergy preferences.

At step 670, the processor causes the system 100 to receive, as an order, a selection of at least one menu item of the subset of the plurality of menu items, by a second touch command of the user on the first graphical user interface. For example, the system 100 may enable the user to e-select food by viewing a restaurant's menu in advance and/or pre-purchase the meal the user selects. In another example, the system 100 may indicate on the user interface that discounts may be offered for committing to a particular meal in advance. it is contemplated that meal purchases may be split amongst multiple parties, such as with friends meeting at a restaurant for dinner. The system 100 may provide a "group cart" feature. For example, this would display a list of the pre-ordered food for a group. Individual users from the group may select a subset of the pre-ordered food and pay for whatever items of the pre-ordered food that they would like to pay.

In aspects of the present disclosure, the processor may cause the system 100 to display a prompt for selecting a desired food service speed and display a prompt for selecting a desired duration of occupying the table. For example, the system 100 may set a price for the order based on the desired duration the user will occupy the table. In aspects of the present disclosure, the system 100 may include an integrated point of sale (POS) system.

At step 680, the processor causes the system 100 to transmit the order to a second graphical user interface configured for use on an electronic device of a restaurant manager or staff which tracks tables and provides an interaction with users. In aspects of the present disclosure, the user may indicate whether the order is to stay or to go (e.g., take out).

In aspects of the present disclosure, the processor may cause the system 100 to store data gathered during the user dining experiences within a database for use in providing recommendations. In aspects of the present disclosure, the processor may cause the system 100 to parse, by a natural language model, the user dining experiences and predict, by a machine learning network, one or more recommendations based on the parsed user dining experiences.

In aspects of the present disclosure, the processor may cause the system 100 to provide a recommendation on the first graphical user interface of certain foods based on a dining speed preference. For example, the user can select their desired food service speed (e.g., slow and casual for a long meal, as quickly as possible if the person is in a rush, or somewhere in the middle). The system 100 may display an option to select desired duration of occupying the table. In aspects of the present disclosure, pricing may be varied to charge more or less based on how long the user will occupy the table. For example, a user might be able to find a table available for 30 minutes at a time when they are in a rush to make it to a movie or a similar activity and therefore a quick table occupancy with food pre-ordered might be desirable in that situation. In another example, users who are the parents of children may be able to get through a reasonable meal within 45 minutes, but 2 hours at a table might be difficult. The system 100 solves this technical problem by providing the technical solution of providing real-time table availability and duration.

In aspects of the present disclosure, the system 100 may be employed in an event (e.g., a pro sport or concert) to pre-order and pre-pay for concessions, and get the concessions delivered to a seat or location. For example, the restaurant may be at a sporting event (e.g., a hockey game). In aspects of the present disclosure, the processor may cause the system 100 to provide a geolocation of the user (e.g., seat 5G section 9) and cause the delivery of concessions to the geolocation.

The system 100 provides the benefit of giving diners more options and control over their meal experience and allows them to customize a dining experience based on their own needs. In aspects of the present disclosure, the system 100 may provide a recommendation of certain food options based on preferred dining speed. In aspects of the present disclosure, the system 100 may recommend food options in a certain price range. For example, a restaurant can push certain foods with discounts, or an incentive (e.g., two for one on appetizers). By enabling the pre-payment of food, the system 100 prevents cancellation of reservations and therefore allows the restaurant to avoid empty tables. In aspects of the present disclosure, the system 100 may facilitate charging a cancelation fee.

In aspects of the present disclosure, the system 100 may be employed at a wide range of venues, including sports arenas, concert halls, and other entertainment venues. The system 100 may retrieve a user's geographical data (e.g., GPS coordinates, Wi-Fi triangulation, Bluetooth beacon proximity, QR code check-in location, or data derived from the venue's ticket including seat number and section) from the user's mobile device and determine, based on the location, the available concession and restaurant options available at the particular venue or particular subarea within a venue (i.e., a user in section 500 may receive different concession or restaurant options than a user in section 300). The system 100 may use the user's geographical data to determine the user's exact location within a venue. The system 100 may determine and present the user with the options most tailored to the user's preferences based on the user's past ordering history (i.e., a user may show preference for a particular food through ordering patterns), dietary restrictions (e.g., allergies, religious observation, low sodium foods, vegan, or keto options), dietary preferences (e.g., cuisine type or low-calorie), ordering preferences (e.g., snacks, quick bites, lunch options, dinner options, or past food modifications), time preference (i.e., faster options may receive priority), and/or price restrictions. The system 100 may then enable a user to place an order for food or beverages via a mobile interface, and optionally select either a pickup option or a delivery to the designated seat or location. For example, a concert attendee seated in section 100, row D, seat 2 may place an order for a beverage and snack and elect to have the items delivered directly to the seat without needing to leave their location.

In aspects of the present disclosure, the system 100 may be implemented in hospitality venues such as hotels and resorts. The system 100 may associate a user's reservation data or room number with an order. In some implementations, the system 100 may derive user preferences for delivery options from past ordering history (i.e., the system may determine and prioritize likely user-preferred delivery options based on data from the user and other similar users). In other implementations, the system 100 may permit a user to select from one or more delivery options, including in-restaurant pickup, delivery to a reserved table in a hotel restaurant, or delivery to the user's guest room. The system 100 may access and cross-reference hotel guest information, dining reservations, and the current location of mobile devices to facilitate efficient order fulfillment.

In aspects of the present disclosure, the system 100 may be configured for use aboard cruise ships, where food service occurs across multiple decks and zones. A user may place an order for food or beverage items and elect to pick up the order at a designated location or have the order delivered to a reserved table or stateroom. The system 100 may track passenger location via the cruise ship's internal network or associated guest services platform, and direct cruise personnel to deliver food or beverages to the user's location. Likewise, the system 101 may continuously update food or beverage recommendations as the user moves throughout the various areas of the ship.

In aspects of the present disclosure, the system 100 may be employed at mobile concessions or food trucks. The system 100 may track food truck locations and accordingly adjust user-end recommendations based on a food truck's location or anticipated location based on historical location data (e.g., determining that a food truck typically operates in region X on every Tuesday but only during August). A user may place an order via the system 100 and receive instructions for pickup at a designated time and location. The system 100 may adjust pickup times dynamically based on estimated preparation time, current order volume, or real-time traffic data.

In aspects of the present disclosure, the system 100 may be employed in conjunction with movie theater concessions or restaurants located in or proximal to the movie theater. In some implementations, the system 100 may allow patrons to order from a mobile device and select delivery to a particular seat within a specific theater screen or auditorium. Alternatively, the user may select an in-lobby pickup option, and the system 100 may provide a notification when the order is ready.

In aspects of the present disclosure, the system 100 may provide personalized food and beverage recommendations based on a user's historical order patterns, stated dietary preferences, location context (e.g., proximity to available vendors), operational status of a restaurant (e.g., whether a restaurant is closing soon or if there are available tables) and contextual signals such as time of day or event type. The processor 201 may employ one or more AI components, including but not limited to a deep learning module 404, a classifier 406, a rules-based module 408, and a recommendation module 424, to identify likely preferences and output suggested menu items. In some implementations, the system 100 may apply natural language processing to analyze prior text-based feedback or customer reviews to refine future recommendations. In other implementations, the system 100 may adjust its recommendations based on learned constraints such as delivery distance, food preparation time (e.g., fast food, sit-down, or fast casual options), or pricing preference.

In further aspects, the system 100 may personalize food and beverage recommendations by integrating a multi-layered profile for each user. The profile may include static preference data (e.g., manually entered dietary restrictions, preferred cuisine types) as well as dynamically inferred behavioral patterns derived from prior engagement history. For example, the system 100 may detect that a user tends to select low-sugar beverages during weekday lunch hours or consistently opts for snack options when ordering at music venues. These patterns may be learned using a logic learning machine module 414 and refined using reinforcement or supervised learning techniques to improve predictive accuracy over time.

In some aspects, the system 100 may correlate user preferences with venue-specific constraints, such as vendor availability, kitchen load, or delivery method (e.g., in-seat delivery or counter pickup). The system 100 may also incorporate real-time contextual signals—such as current weather conditions, event type (e.g., sports game or theater show), or the user's recent movement pattern (e.g., sedentary or in transit)—to generate contextually appropriate recommendations.

In certain embodiments, the system 100 may access a user's prior order modifications, or dietary substitutions to refine output rankings. For example, if a user repeatedly excludes onions from meals, the system 100 may deprioritize menu items with onions or preemptively offer a customization suggestion.

In aspects of the present disclosure, the large language model 418 may employ natural language processing not only to analyze prior user-submitted feedback but also to parse third-party reviews, social media commentary, or chat-based interactions to infer sentiment and flavor preferences. In other implementations, a large language model 418 may be employed to summarize trends across user cohorts (e.g., "users who enjoy spicy food also liked dish X at venue Y") and use such correlations to suggest new items the user has not yet encountered.

In aspects of the present disclosure, the recommendation module 424 may further consider operational constraints such as estimated food preparation time, maximum allowable delivery window, congestion at pickup stations, or seat-specific delivery feasibility when generating suggested options. By integrating these dynamic constraints with user-specific inputs, the system 100 may provide the user with a ranked list of food and beverage items optimized for both personal relevance and logistical viability.

Figure 8:
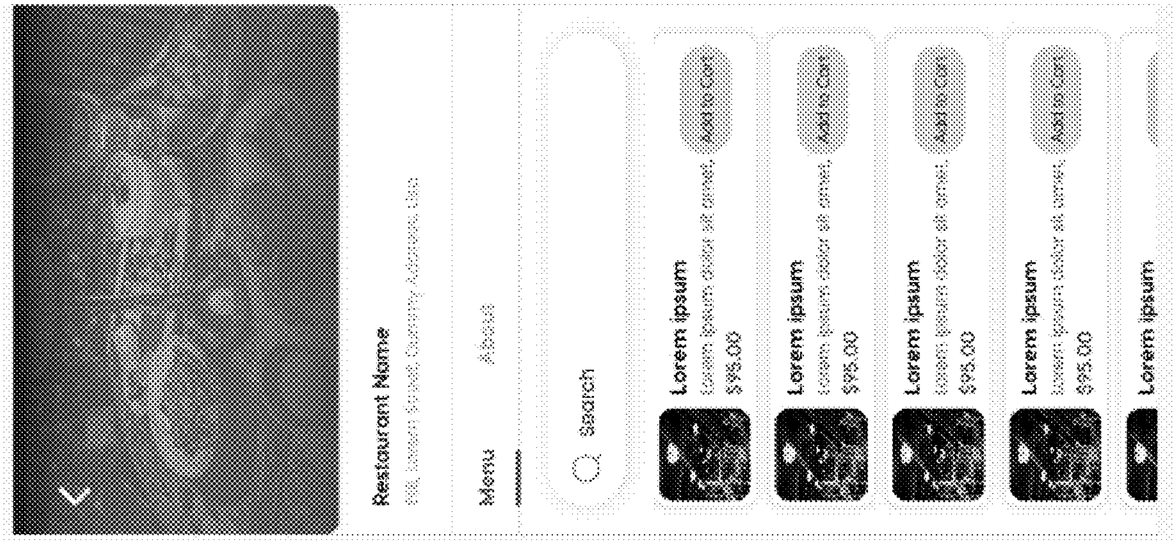
FIGS. 8 and 9 are example graphical user interfaces for the system for streamlined restaurant turnover according to aspects of the present disclosure.

Referring to FIG. 8, an example restaurant selection GUI 800 for use with system 100 of FIG. 1 is shown. When a user selects a restaurant, for example in step 640 of FIG. 6, GUI 800 may be displayed. GUI 800 provides the user additional information about the restaurant, such as reviews, ratings, and/or directions. GUI 800 further provides the menu options of steps 660 and 670 of FIG. 7. For example, the GUI 800 may include a selection of featured restaurants, showcasing high-quality images and brief descriptions to catch their interest. As users scroll down, they may encounter a list of restaurants displayed as tiles and/or cards, each card containing a thumbnail image, and information such as the restaurant's name, average rating, cuisine type, and/or distance from the current location. Tapping on a restaurant image expands it to a detailed view, presenting comprehensive information such as the menu, operating hours, contact details, and customer reviews. Additionally, the detailed view may include a "Book a Table" button for reservations and/or a "Get Directions" button that opens the integrated map feature.

Figure 9:
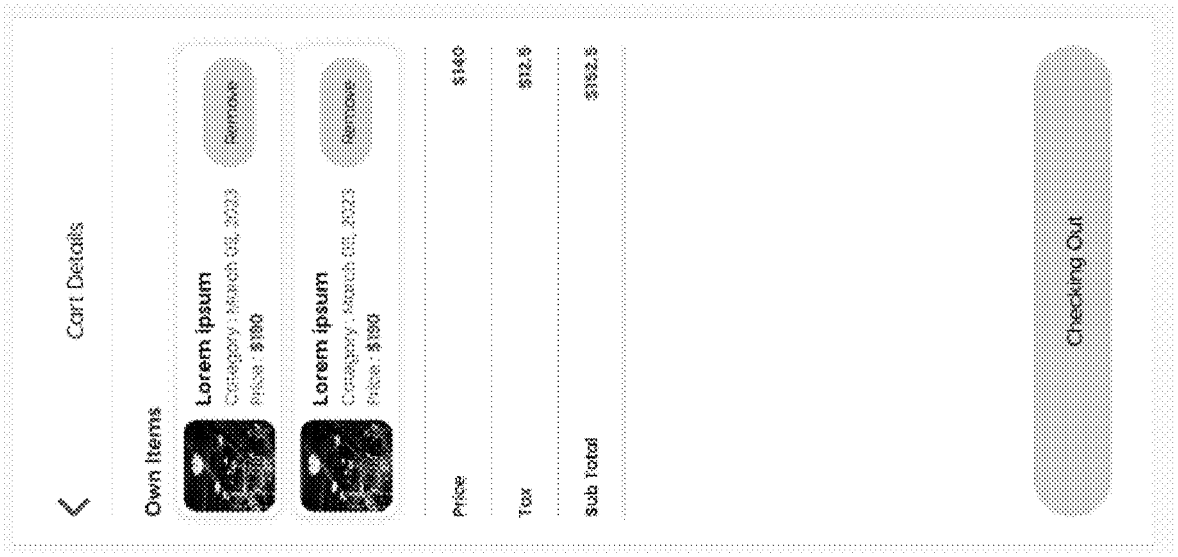

Referring to FIG. 9, an example cart details GUI 900 for use with system 100 of FIG. 1 is shown. After selection of the menu items in steps 660 and 670 of FIG. 7, GUI 900 may be displayed to display the items and totals. The GUI 900 may further include a checkout button 902.

Figure 10:
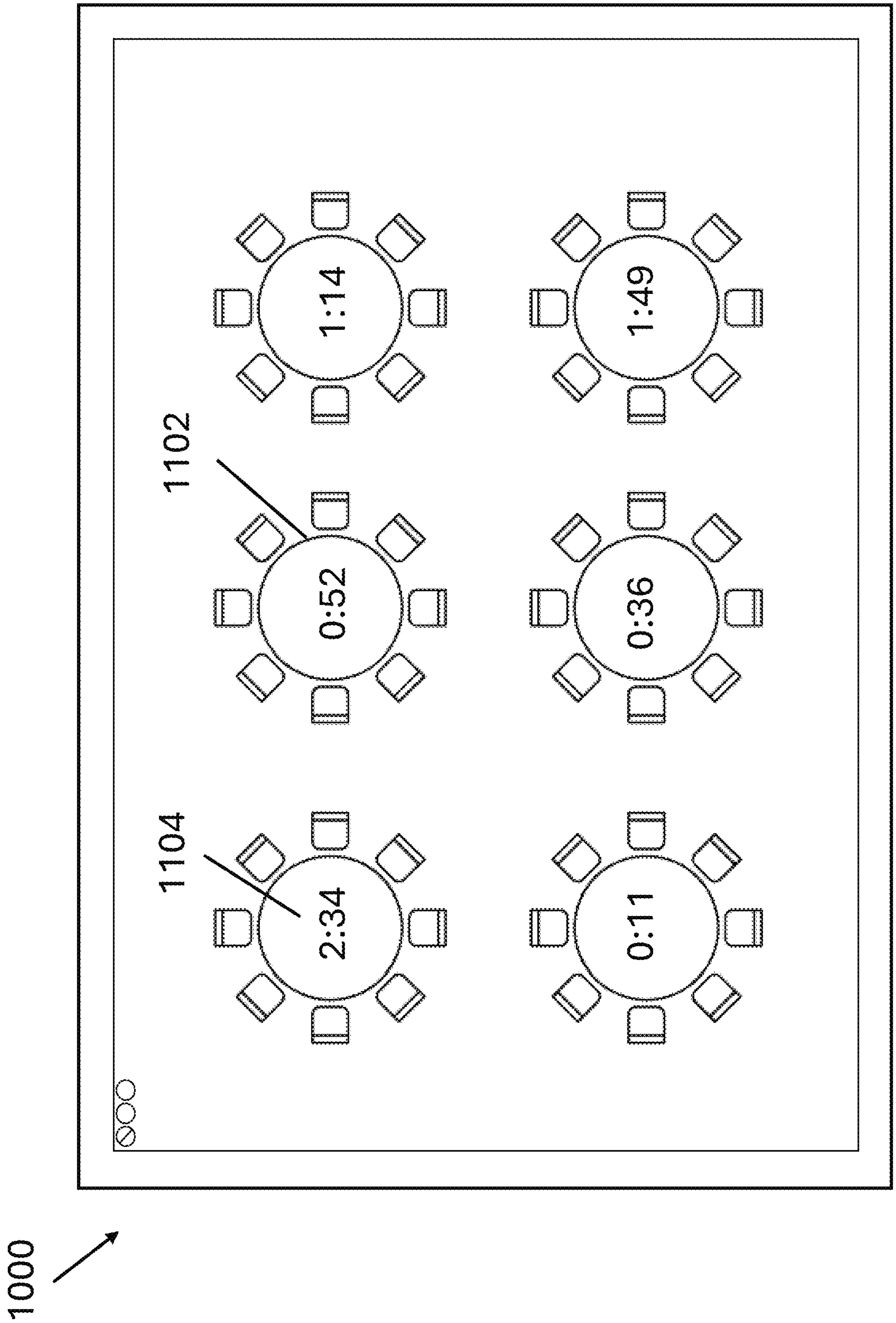
FIG. 10 is an example graphical user interface for table selection according to aspects of the present disclosure.

Referring to FIG. 10, an example graphical user interface 1000 for table selection for use with system 100 of FIG. 1. The graphical user interface 1000 generally includes a plurality of tables 1002 available at the user selected restaurant. For example, the system 100 may display a map of the restaurant and the user can select the table that they want from the map.

In aspects of the present disclosure, the processor may cause the system 100 to display on the first graphical user interface a map of a plurality of tables 1002 in a restaurant with an indication of available times and durations 1004 for each of the plurality of tables 1002 and receive a selection of a particular table 1002 of the plurality of tables 1002 by a touch command of the user on the first graphical user interface. In aspects of the present disclosure, the processor may cause the system 100 to transmit, to the second graphical user interface, the selection of the particular table 1002 and provide an indication confirming the reservation of the selected particular table for a specific time.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A system for streamlined restaurant turnover, comprising:
- a processor; and
- a memory, including instructions stored thereon, which, when executed by the processor, cause the system to:
- verify credentials of a user and access user preferences;
- access a geographic location of the user;
  - access a plurality of restaurants based on the user preferences and at least one of a geographic proximity of the user or a prior selection of the user;
  - display at least some of the restaurants of the plurality of restaurants on a first graphical user interface;
  - receive a selection of a restaurant of the plurality of restaurants by a first input of the user on the first graphical user interface;
  - access, from a database, a menu from the selected restaurant of the plurality of restaurants;
  - display a subset of a plurality of menu items based on a category;
  - display, on the first graphical user interface, a map of a plurality of tables in a restaurant with an indication of real-time table availability and duration for each of the plurality of tables;
  - receive a selection of a particular table of the plurality of tables by a second input of the user on the first graphical user interface;
  - display a prompt for selecting a desired food service speed on the first graphical user interface;
  - receive, from the user via the first graphical user interface, a selection of the desired food service speed;
  - in response to receiving the selection of the desired food service speed, provide, on the first graphical user interface, a recommendation of certain foods based on the selected desired food service speed;
  - display a prompt for selecting a desired duration of occupying the table;
  - receive, from the user via the first graphical user interface, a selection of the desired duration of occupying the table;
  - set a price for an order based on the selected desired duration the user will occupy the table;
  - receive, as the order, a selection of at least one menu item of the subset of the plurality of menu items, based on the recommendation, by a third input of the user on the first graphical user interface;
  - transmit, to a second graphical user interface of a restaurant manager or staff, the selection of the particular table and the order; and
  - receive a pre-payment for the order confirming the reservation of the selected particular table for the selected desired duration of occupying the table.

2. The system of claim 1, wherein the instructions, when executed by the processor, further cause the system to:
- store data gathered during the user dining experiences within a database for use in providing recommendations.

3. The system of claim 2, wherein the instructions, when executed by the processor, further cause the system to:
- parse, by a natural language model, the user dining experiences; and
- predict, by a machine learning network, one or more recommendations based on the parsed user dining experiences.

4. The system of claim 1, wherein the restaurant is at a sporting event.

5. The system of claim 4, wherein the instructions, when executed by the processor, further cause the system to:
- provide a geolocation of the user; and
- cause the delivery of concessions to the geolocation.

6. A computer-implemented method for streamlined restaurant turnover, comprising:
- verifying credentials of a user and accessing user preferences;
- accessing a geographic location of the user;
  - accessing a plurality of restaurants based on the user preferences and at least one of a geographic proximity of the user or a prior selection of the user;
  - displaying at least some of the restaurants of the plurality of restaurants on a first graphical user interface;
  - receiving a selection of a restaurant of the plurality of restaurants by a first input of the user on the first graphical user interface;
  - accessing, from a database, a menu from the selected restaurant of the plurality of restaurants;
  - displaying a subset of a plurality of menu items based on a category;
  - displaying, on the first graphical user interface, a map of a plurality of tables in a restaurant with an indication of real-time table availability and duration for each of the plurality of tables;
  - receiving a selection of a particular table of the plurality of tables by a second input of the user on the first graphical user interface;
  - displaying a prompt for selecting a desired food service speed on the first graphical user interface;
  - receiving, from the user via the first graphical user interface, a selection of the desired food service speed;
  - in response to receiving the selection of the desired food service speed, providing, on the first graphical user interface, a recommendation of certain foods based on the selected desired food service speed;
  - displaying a prompt for selecting a desired duration of occupying the table;
  - receiving, from the user via the first graphical user interface, a selection of the desired duration of occupying the table;
  - setting a price for an order based on the selected desired duration the user will occupy the table;
  - receiving, as the order, a selection of at least one menu item of the subset of the plurality of menu items, based on the recommendation, by a third input of the user on the first graphical user interface;
  - transmitting, to a second graphical user interface of a restaurant manager or staff, the selection of the particular table and the order; and
  - receiving a pre-payment for the order confirming the reservation of the selected particular table for the selected desired duration of occupying the table.

7. The computer-implemented method of claim 6, further comprising:
- storing data gathered during the user dining experiences within a database for use in providing recommendations.

8. The computer-implemented method of claim 7, further comprising:

parsing, by a natural language model, the user dining experiences; and predicting by a machine learning network, one or more recommendations based on the parsed user dining experiences.

9. The computer-implemented method of claim 6, wherein the restaurant is at a sporting event.

10. The computer-implemented method of claim 9, further comprising:

providing a geolocation of the user; and causing the delivery of concessions to the geolocation.

* * * * *